(12) United States Patent
Shimizu (10) Patent No.: US 8,967,358 B2
(45) Date of Patent: Mar. 3, 2015

(54) CHUTE TURNING RESTRICTION MECHANISM

(71) Applicant: Kayaba Industry Co., Ltd., Minato-ku, Tokyo (JP)

(72) Inventor: Hiroyuki Shimizu, Saitama (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 14/234,453

(22) PCT Filed: Apr. 1, 2013

(86) PCT No.: PCT/JP2013/059960
§ 371 (c)(1),
(2) Date: Jan. 23, 2014

(87) PCT Pub. No.: WO2014/030381
PCT Pub. Date: Feb. 27, 2014

(65) Prior Publication Data
US 2014/0311853 A1    Oct. 23, 2014

(51) Int. Cl.
*B65G 11/12*    (2006.01)
*B65G 11/18*    (2006.01)

(52) U.S. Cl.
CPC ............. *B65G 11/18* (2013.01); *B65G 11/126* (2013.01)
USPC ............. 193/22; 198/317; 198/360; 198/538; 198/861.6

(58) Field of Classification Search
CPC ...... B65G 11/12; B65G 41/002; B65G 21/12; B28C 5/42; B60P 3/16
USPC ........... 198/317, 360, 538, 592, 861.1, 861.2, 198/861.6; 193/4, 22
See application file for complete search history.

(56) References Cited

U.S. PATENT DOCUMENTS 3,633,719 A * 1/1972 Lynch ............................. 193/10
6,578,694 B2 * 6/2003 Harris et al. .................... 193/16
(Continued)

FOREIGN PATENT DOCUMENTS

CN    201325122 Y    10/2009
CN    201702861 U    1/2011
(Continued)

OTHER PUBLICATIONS

International Search Report and Written Opinion mailed Jul. 2, 2013, in corresponding International Application No. PCT/JP2013/059960.
(Continued)

*Primary Examiner* — Leslie A Nicholson, III
(74) *Attorney, Agent, or Firm* — Lowe Hauptman & Ham, LLP (57) ABSTRACT

A chute turning restriction mechanism includes: a rotary shaft on which a chute is disposed and which is provided to be capable of rotating relative to a vehicle body of a mixer truck; a bracket that is provided on the vehicle body and includes an insertion hole into which the rotary shaft is inserted and a cutaway portion formed by cutting away a part of the insertion hole; an inner diameter adjustment shaft provided across the cutaway portion to be capable of adjusting an inner diameter of the insertion hole, and configured to restrict rotation of the rotary shaft by reducing the inner diameter of the insertion hole; a rotary body that is provided to rotate together with the rotary shaft and includes an engagement groove; and a lock lever that is provided to be capable of rotating about the inner diameter adjustment shaft, and that restricts the rotation of the rotary shaft by engaging with the engagement groove.

8 Claims, 13 Drawing Sheets

(56) References Cited

U.S. PATENT DOCUMENTS

| | | | |
|---|---|---|---|
| 7,401,969 B2 * | 7/2008 | Johnson | 366/68 |
| 7,520,380 B2 * | 4/2009 | Ranger | 198/861.1 |

FOREIGN PATENT DOCUMENTS

| | | |
|---|---|---|
| JP | 58-171311 U | 11/1983 |
| JP | 62-18407 Y2 | 5/1987 |
| JP | 11-048853 A | 2/1999 |
| JP | 2001-301519 A | 10/2001 |
| JP | 2004-017713 A | 1/2004 |

OTHER PUBLICATIONS

Office Action mailed Sep. 18, 2014, corresponding to Chinese patent application No. 201380002672.X.

* cited by examiner

CHUTE TURNING RESTRICTION MECHANISM

RELATED APPLICATIONS

The present application is a National Phase of International Application Number PCT/JP2013/059960, filed Apr. 1, 2013.

TECHNICAL FIELD

The present invention relates to a chute turning restriction mechanism that restricts turning of a chute disposed on a vehicle body of a mixer truck.

BACKGROUND ART

A concrete mixer truck is a vehicle that transports fresh concrete loaded into a mixer drum that is carried on a vehicle body to be free to rotate. The concrete mixer truck includes a chute that guides fresh concrete discharged from the mixer drum. To guide the fresh concrete to a desired position, the chute is configured to be able to turn in a horizontal direction, and such that a tilt angle thereof can be adjusted.

SUMMARY OF INVENTION

JP2004-17713A discloses a concrete mixer truck including a turning plate provided on a column support on which a chute is disposed, a fixed plate provided on a stay that supports the column support to be free to rotate, a first turning restriction device that fixes the chute in a desired turning position by sandwiching the turning plate from above and below using a sandwiching member provided on the fixed plate, and a second turning restriction device that fixes the chute in a predetermined turning position by engaging a pin provided on the turning plate with a notch in the fixed plate.

In the concrete mixer truck described above, however, the first turning restriction device and the second turning restriction device are provided separately in different positions, and therefore a mechanism for restricting turning of the chute is complicated.

It is therefore an object of the present invention to provide a chute turning restriction mechanism that can restrict turning of a chute of a mixer truck with a simple configuration.

According to an aspect of the present invention, a chute turning restriction mechanism that restricts turning of a chute of a concrete mixer truck is provided. The chute turning restriction mechanism includes: a rotary shaft on which the chute is disposed and which is provided to be capable of rotating relative to a vehicle body of the concrete mixer truck; a bracket that is provided on the vehicle body, and includes an insertion hole into which the rotary shaft is inserted and a cutaway portion formed by cutting away a part of the insertion hole; and an inner diameter adjustment shaft provided across the cutaway portion to be capable of adjusting an inner diameter of the insertion hole, and configured to restrict rotation of the rotary shaft by reducing the inner diameter of the insertion hole. The chute turning restriction mechanism also includes: a rotary body that is provided to rotate together with the rotary shaft and includes an engagement groove; and a lock lever that is provided to be capable of rotating about the inner diameter adjustment shaft, and that restricts the rotation of the rotary shaft by engaging with the engagement groove.

Embodiments and advantages of this invention will be described in detail below with reference to the attached figures.

DESCRIPTION OF EMBODIMENTS

Referring to FIGS. 1 to 12, a chute turning restriction mechanism 100 of a concrete mixer truck 1 according to an embodiment of the present invention will be described.

Figure 1:
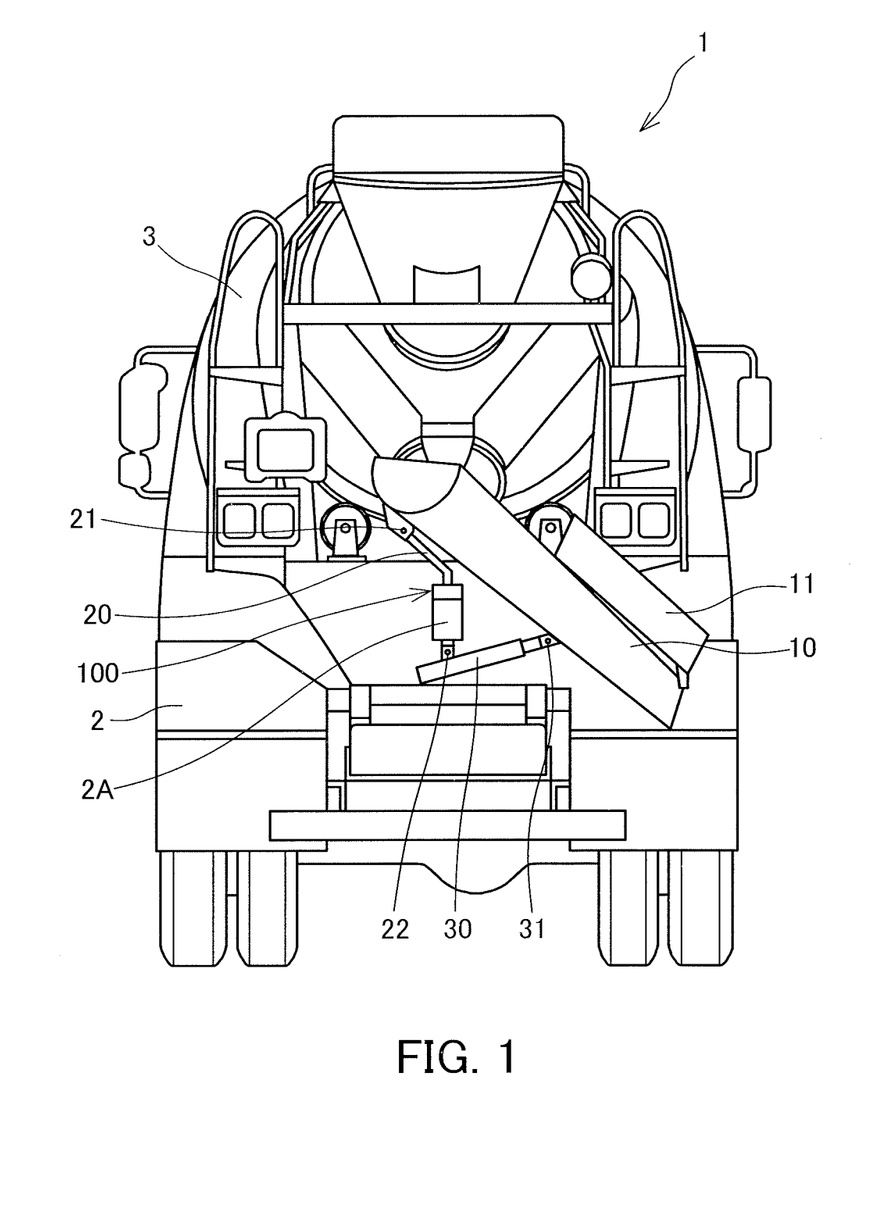
FIG. 1 is a back view of a concrete mixer truck provided with a chute turning restriction mechanism according to an embodiment of the present invention.

As shown in FIG. 1, the concrete mixer truck 1 includes a mixer drum 3 disposed rotatably on a vehicle body 2, and a chute 10 disposed turnably on a rear portion of the vehicle body 2 in order to guide fresh concrete discharged from the mixer drum 3.

An extension chute 11 is provided on a discharge end (a lower end) of the chute 10 to be capable of rotating in an up-down direction. The chute 10 and the extension chute 11 are formed as chute-shaped passage members.

When the extension chute 11 is positioned in a storage position on the chute 10, the fresh concrete discharged from the mixer drum 3 is discharged from the discharge end of the chute 10. When, on the other hand, the extension chute 11 is rotated to a maximum rotation position in which the extension chute 11 forms a single passage with the chute 10, the fresh concrete discharged from the mixer drum 3 is discharged from a discharge end of the extension chute 11. By using the extension chute 11 in this manner, a passage length of the passage through which the fresh concrete discharged from the mixer drum 3 is guided can be extended.

Figure 2:
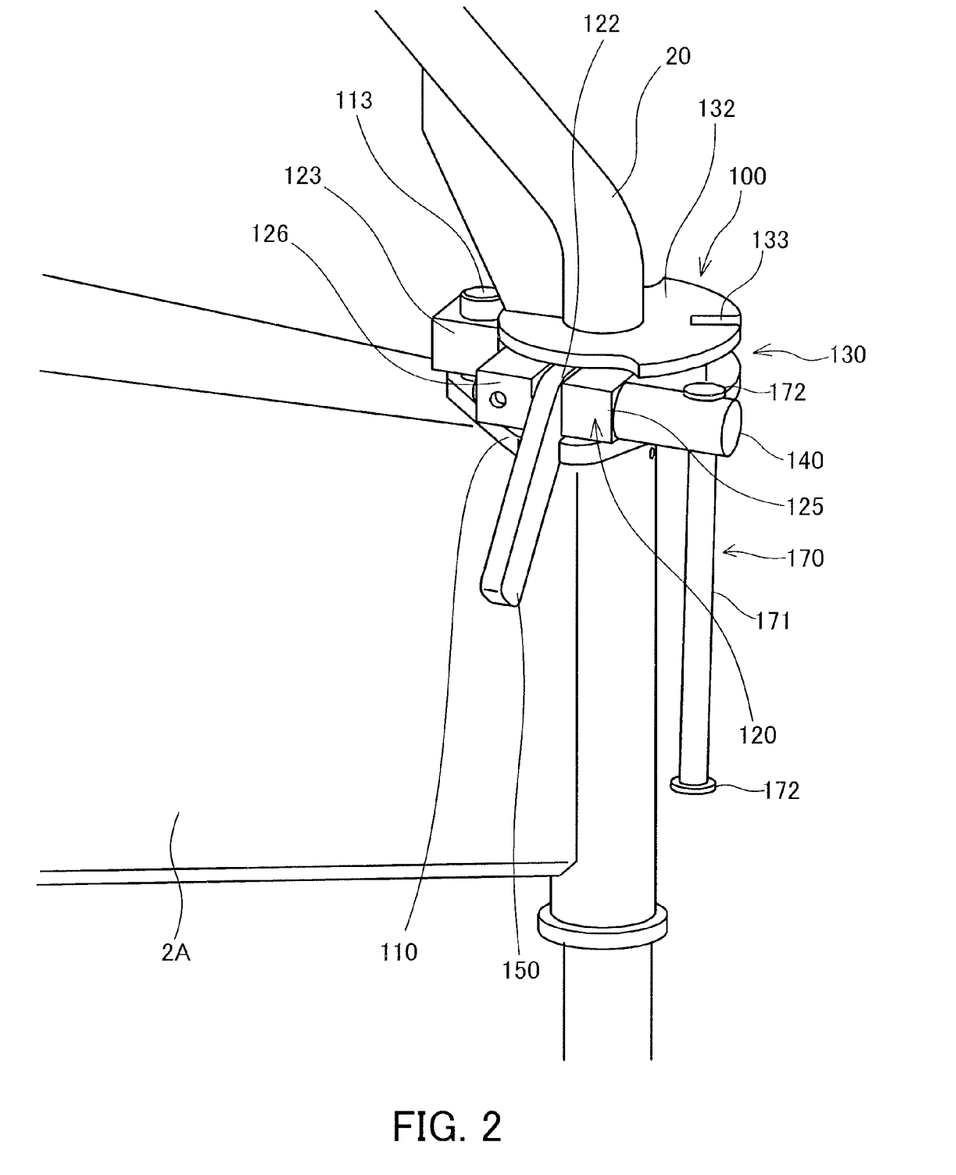
FIG. 2 is a perspective view of the chute turning restriction mechanism.

As shown in FIGS. 1 and 2, a support arm 2A that projects rearward is formed in a rear portion of the vehicle body 2. A rotary shaft 20 that supports the chute 10 is attached to the support arm 2A forming a part of the vehicle body 2. The support arm 2A includes a bearing hole 2B (see FIG. 3) that extends in the up-down direction, and the rotary shaft 20 is inserted into the bearing hole 2B to be free to rotate. When the rotary shaft 20 rotates relative to the support arm 2A, the chute 10 turns in a horizontal direction. It should be noted that the chute 10 and the extension chute 11 have been omitted from FIG. 2.

As shown in FIG. 1, an upper end portion of the rotary shaft 20 positioned above the support arm 2A is attached rotatably to a rear surface upper portion of the chute 10 via a rotary pin 21. Further, a telescopic arm 30 is attached rotatably via a rotary pin 22 to a lower end portion of the rotary shaft 20 positioned below the support arm 2A. A tip end of the telescopic arm 30 is attached rotatably to a rear surface lower portion of the chute 10 via a rotary pin 31. The telescopic arm 30 is configured to extend and contract in an arm axis direction. By causing the telescopic arm 30 to extend and contract, a tilt angle of the chute 10 can be modified.

Hence, the chute 10 is configured such that a turning position and the tilt angle thereof can be adjusted, with the result that the fresh concrete discharged from the mixer drum 3 can be guided to a desired position. Further, following the end of a fresh concrete discharge operation or the like, the chute 10 is stored in the storage position so as not to cause an obstruction. In the storage position, the discharge end of the chute 10 is oriented substantially 90° leftward relative to a vehicle advancement direction, for example, and positioned in a lowermost position.

The concrete mixer truck 1 described above includes the chute turning restriction mechanism 100 that restricts turning of the chute 10. The chute turning restriction mechanism 100 has a function for fixing the chute 10 in a desired turning position and a function for fixing the chute 10 in the storage position (a predetermined turning position).

As shown in FIG. 2, the chute turning restriction mechanism 100 includes a fixed plate 110 serving as an example of a carrying portion that is fixed to an upper surface of the support arm 2A, a bracket 120 that is carried on the fixed plate 110 and includes an insertion hole 121 (see FIG. 6) into which the rotary shaft 20 is inserted, a rotary body 130 that includes an engagement groove 133 and rotates together with the rotary shaft 20, an inner diameter adjustment shaft 140 that adjusts an inner diameter of the insertion hole 121 in the bracket 120, and a lock lever 150 that engages with the engagement groove 133 of the rotary body 130.

Figure 3:
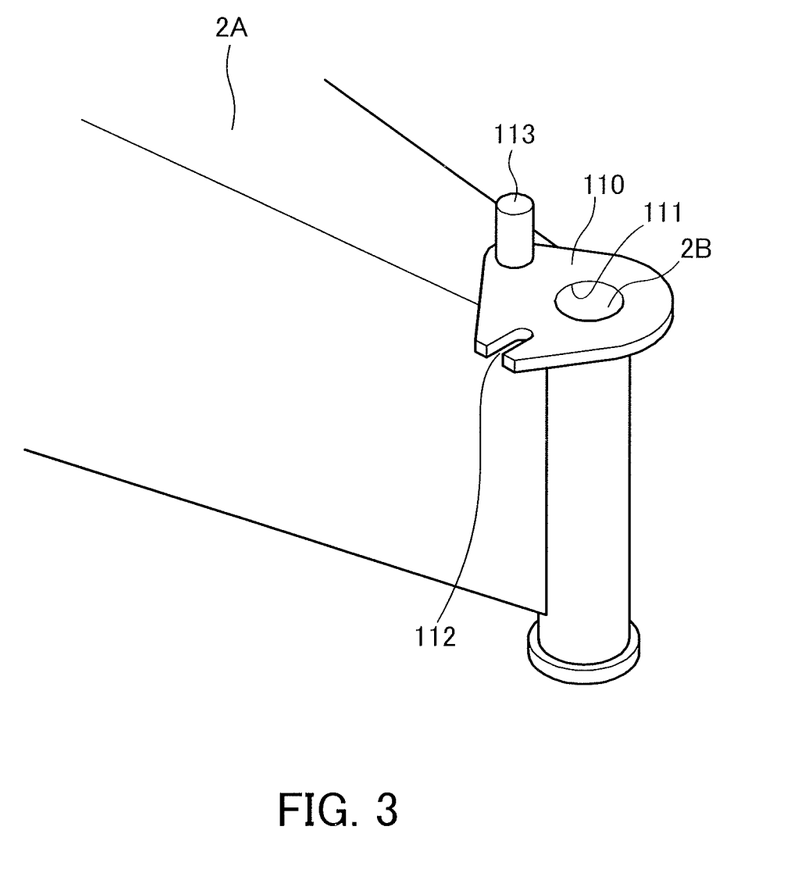
FIG. 3 is a perspective view of a support arm provided in a vehicle body rear portion of the concrete mixer truck.

As shown in FIGS. 2 and 3, the fixed plate 110 is a plate-shaped member fixed onto the support arm 2A. The fixed plate 110 includes a through hole 111 through which the rotary shaft 20 passes, and the through hole 111 communicates with the bearing hole 2B in the support arm 2A.

A guide groove 112 that guides a rotation operation of the lock lever 150 is formed in an outer edge of the fixed plate 110. The guide groove 112 is a U-shaped cutaway formed to penetrate the fixed plate 10 in the up-down direction (a plate thickness direction). Further, an upwardly projecting columnar pin 113 is formed on the fixed plate 110. The pin 113 is a member for coupling the fixed plate 110 to the bracket 120.

Figure 4:
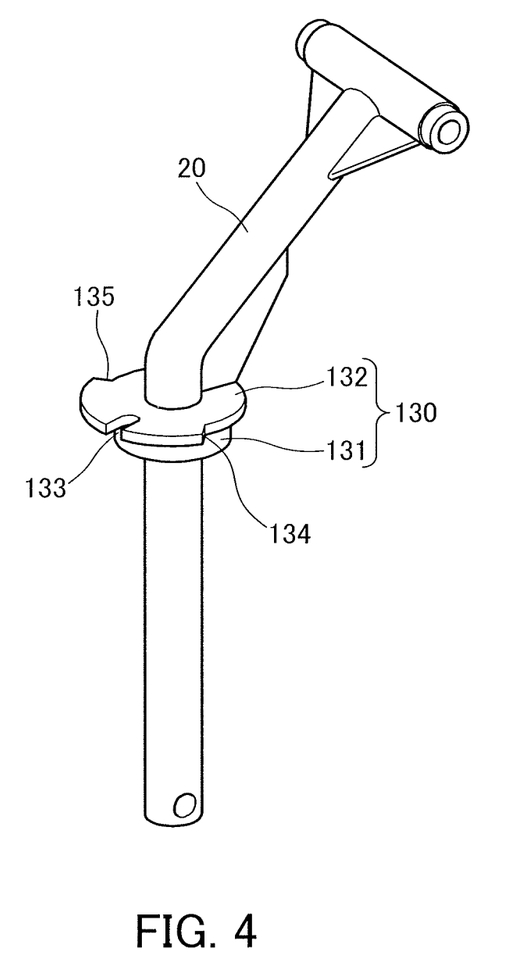
FIG. 4 is a perspective view of a rotary shaft on which a chute is disposed.

As shown in FIGS. 2 and 4, the rotary body 130 is provided in a substantially central position of the rotary shaft 20 in an axial direction and fitted externally to an outer periphery of the rotary shaft 20. By inserting the rotary shaft 20 below the rotary body 130 into the through hole 111 (see FIG. 3) and the bearing hole 2B (see FIG. 3), the rotary shaft 20 is supported rotatably by the support arm 2A. The rotary body 130 is fixed to the rotary shaft 20, and therefore rotates in response to rotation of the rotary shaft 20.

The rotary body 130 includes a columnar portion 131 provided coaxially with the rotary shaft 20, and a disc portion 132 connected to an upper end of the columnar portion 131. The columnar portion 131 and the disc portion 132 are formed as a part of the rotary shaft 20.

Figure 5:
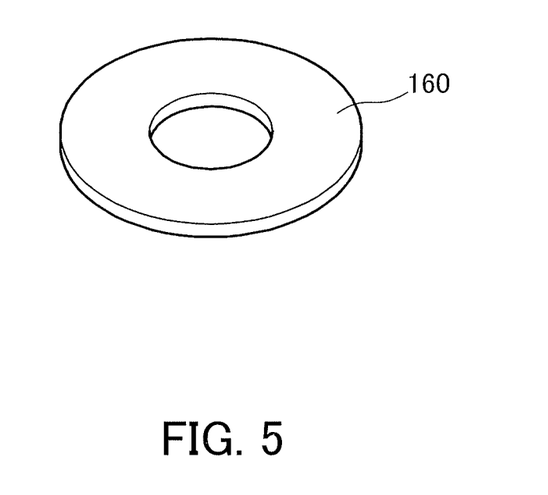
FIG. 5 is a perspective view of a ring-shaped collar constituting the chute turning restriction mechanism.

When the rotary shaft 20 is disposed on the support arm 2A, the columnar portion 131 is carried on the fixed plate 110. An outer diameter of the columnar portion 131 is set to be larger than an outer diameter of the rotary shaft 20. When the rotary shaft 20 rotates, the columnar portion 131 rotates while sliding over the fixed plate 110. As shown in FIG. 5, a ring-shaped collar 160 may be interposed between the fixed plate 110 and the columnar portion 131 to ensure that the columnar portion 131 of the rotary body 130 rotates smoothly.

The disc portion 132 is a plate-shaped member connected to the upper end of the columnar portion 131 so as to extend in a radial direction of the rotary shaft 20. The engagement groove 133 capable of engaging with the lock lever 150 is formed in an outer edge of the disc portion 132. The engagement groove 133 is a U-shaped cutaway formed to penetrate the disc portion 132 in the up-down direction (a plate thickness direction).

Figure 6:
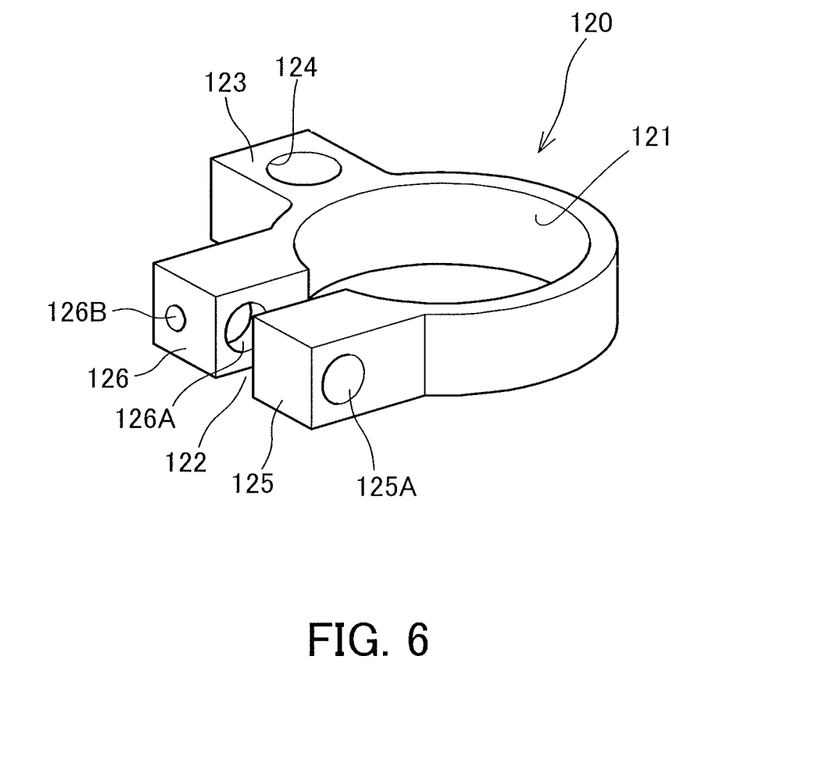
FIG. 6 is a perspective view of a bracket constituting the chute turning restriction mechanism.

As shown in FIGS. 2 and 6, the bracket 120 is a partially cut away, substantially C-shaped annular member. The bracket 120 includes the insertion hole 121 into which the columnar portion 131 provided on the rotary shaft 20 is inserted, and a cutaway portion 122 formed by cutting away a part of an inner periphery of the insertion hole 121.

When the rotary shaft 20 is inserted into the insertion hole 121, the bracket 120 is disposed between the fixed plate 110 and the disc portion 132. At this time, the columnar portion 131 of the rotary body 130 is positioned in the insertion hole 121 in the bracket 120.

The bracket 120 includes a projecting portion 123 that projects outward from an outer peripheral surface, while a coupling hole 124 for coupling the bracket 120 to the pin 113 on the fixed plate 110 is formed in the projecting portion 123. When the bracket 120 is carried on the fixed plate 110, the pin 113 of the fixed plate 110 is inserted into the coupling hole 124. A tip end (an upper end) of the pin 113 projects upward through the coupling hole 124. Hence, the bracket 120 is supported at two points by the rotary shaft 20 inserted into the insertion hole 121 and the pin 113 inserted into the coupling hole 124, and is therefore prevented from rotating about an axis of the rotary shaft 20.

A screw hole 123A (see FIG. 13) is formed in the projecting portion 123 of the bracket 120 so as to penetrate the coupling hole 124 from an outside end surface. By causing a tip end of a bolt (not shown) screwed into the screw hole 123A to contact an outer peripheral surface of the pin 113, the bracket 120 and the fixed plate 110 can be coupled such that no rattling occurs. As a result, rattling can also be suppressed in the chute 10 while turning.

The cutaway portion 122 is formed between two end portions 125, 126 of the bracket 120 in a circumferential direction of the insertion hole 121. One end portion 125 and the other end portion 126 of the bracket 120 are formed to oppose the cutaway portion 122 from either side.

A through hole 125A through which the inner diameter adjustment shaft 140 passes is formed in one end portion 125 of the bracket 120 so as to penetrate in the horizontal direction. A screw hole 126A into which a tip end of the inner diameter adjustment shaft 140 is screwed is formed in the other end portion 126 of the bracket 120 so as to penetrate in the horizontal direction. The through hole 125A and the screw hole 126A are disposed coaxially.

Further, a communicating hole 126B that communicates with the screw hole 126A is formed in the end portion 126 of the bracket 120. A grease nipple (not shown) for supplying grease to the screw hole 126A is attached to the communicating hole 126B in the end portion 126.

Figure 7:
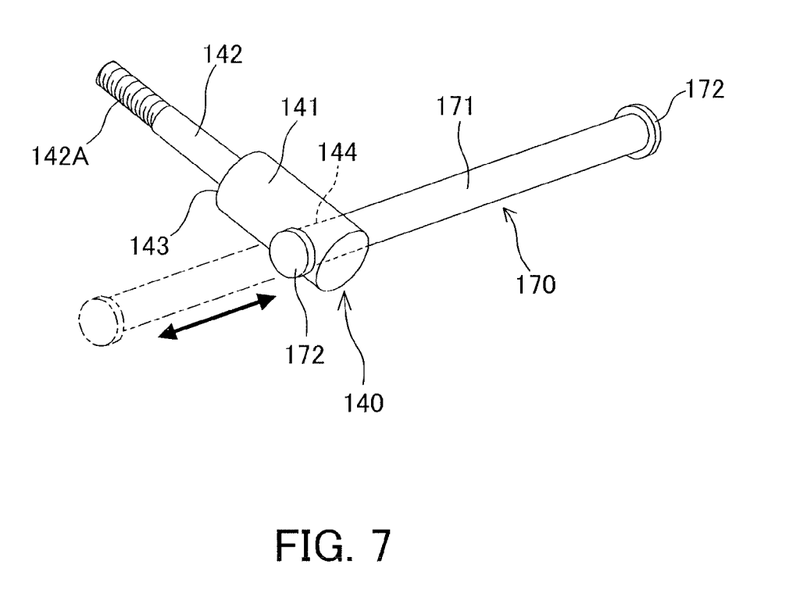
FIG. 7 is a perspective view of an inner diameter adjustment shaft constituting the chute turning restriction mechanism.

As shown in FIGS. 2 and 7, the inner diameter adjustment shaft 140 is a rod-shaped member provided across the cutaway portion 122 of the bracket 120. The inner diameter adjustment shaft 140 is a member for adjusting an inner diameter of the insertion hole 121 in the bracket 120. The inner diameter adjustment shaft 140 includes a base end shaft 141 and a small diameter shaft 142 having a smaller diameter than the base end shaft 141.

An operating bar 170 used to rotate the inner diameter adjustment shaft 140 is attached to the base end shaft 141 of the inner diameter adjustment shaft 140. The operating bar 170 includes a main body bar 171, and a disc-shaped stopper 172 provided on either end of the main body bar 171. When the main body bar 171 is inserted into an insertion hole 144 (see FIGS. 7 and 9) that penetrates the base end shaft 141 in a radial direction, the operating bar 170 is provided on the base end shaft 141.

The small diameter shaft 142 of the inner diameter adjustment shaft 140 projects from one end surface of the base end shaft 141 such that the small diameter shaft 142 and the base end shaft 141 are disposed coaxially. A screw portion 142A that is screwed into the screw hole 126A in the end portion 126 of the bracket 120 is formed on a tip end outer peripheral surface of the small diameter shaft 142.

The small diameter shaft 142 of the inner diameter adjustment shaft 140 is inserted into the through hole 125A from an outer side of the end portion 125 of the bracket 120, whereupon the tip end of the small diameter shaft 142 is screwed into the screw hole 126A from an inner side of the end portion 126 of the bracket 120. At this time, a step 143 positioned on a boundary between the small diameter shaft 142 and the base end shaft 141 contacts an outside end surface of the end portion 126 of the bracket 120. The inner diameter adjustment shaft 140 is attached to the bracket 120 so as to connect the end portions 125, 126 of the bracket 120 through the cutaway portion 122. It should be noted that the through hole 125A in the end portion 125 of the bracket 120 is formed such that only the small diameter shaft 142 of the inner diameter adjustment shaft 140 passes through.

By rotating the inner diameter adjustment shaft 140 via the operating bar 170 so as to adjust an interval of the cutaway portion 122, the inner diameter of the insertion hole 121 in the bracket 120 can be modified. As shown in FIG. 7, when the main body bar 171 of the operating bar 170 is inserted into the insertion hole 144 in the inner diameter adjustment shaft 140, the operating bar 170 can move in the axial direction between the stoppers 172, 172 on the respective ends. Therefore, even when only approximately 180° can be secured as a rotatable region of the main body bar 171, the inner diameter adjustment shaft 140 can be rotated 360° by rotating the main body bar 171 180°, pulling the operating bar 170 back in the axial direction, and then rotating the main body bar 171 180° again. With the operating bar 170, therefore, a rotation operation can be performed on the inner diameter adjustment shaft 140 within a limited space.

By rotating the inner diameter adjustment shaft 140 using the operating lever 170 described above to narrow the interval of the cutaway portion 122, the inner diameter of the insertion hole 121 in the bracket 120 can be reduced. As a result, the outer peripheral surface of the columnar portion 131 of the rotary shaft 20 is clamped by the inner peripheral surface of the insertion hole 121 such that rotation of the rotary shaft 20 is restricted.

By rotating the inner diameter adjustment shaft 140 using the operating lever 170 to widen the interval of the cutaway portion 122, on the other hand, the inner diameter of the insertion hole 121 in the bracket 120 can be increased. In so doing, the clamp applied to the columnar portion 131 by the inner peripheral surface of the insertion hole 121 can be loosened, and as a result, the rotary shaft 20 can rotate freely.

Figure 8:
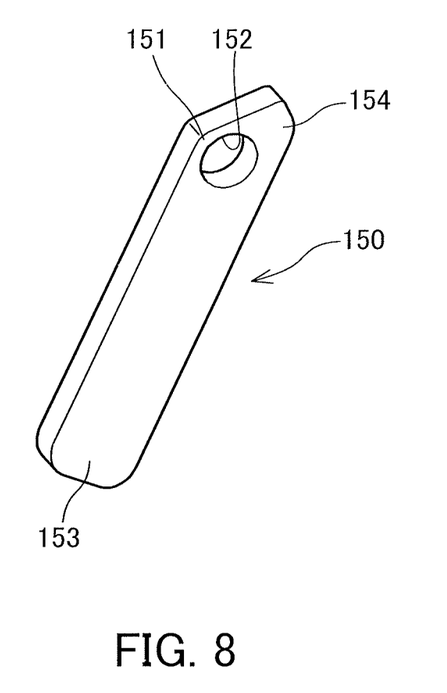
FIG. 8 is a perspective view of a lock lever constituting the chute turning restriction mechanism.

As shown in FIGS. 2 and 8, the lock lever 150 is a substantially rectangular flat plate member. The lock lever 150 includes a through hole 152 provided in a lever upper end portion 151. By inserting the small diameter shaft 142 of the inner diameter adjustment shaft 140 into the through hole 152 in the lock lever 150, the lock lever 150 is supported by the inner diameter adjustment shaft 140 to be free to rotate.

A projecting portion 154 capable of engaging with the engagement groove 133 in the disc portion 132 of the rotary body 130 is formed in a corner portion of the lever upper end portion 151 of the lock lever 150. The lock lever 150 is disposed such that the lever upper end portion 151, including the projecting portion 154, is positioned in the cutaway portion 122, or in other words between the end portions 125, 126 of the bracket 120.

Further, the lock lever 150 is configured such that a lever lower end portion 153 rotates about the small diameter shaft 142 of the inner diameter adjustment shaft 140 within a range extending from a first position (see FIG. 10) to a second position (see FIG. 13) below the first position. When the lock lever 150 is disposed in the inner diameter adjustment shaft 140, the lever lower end portion 153 is positioned in the guide groove 112 of the fixed plate 110.

Figure 10:
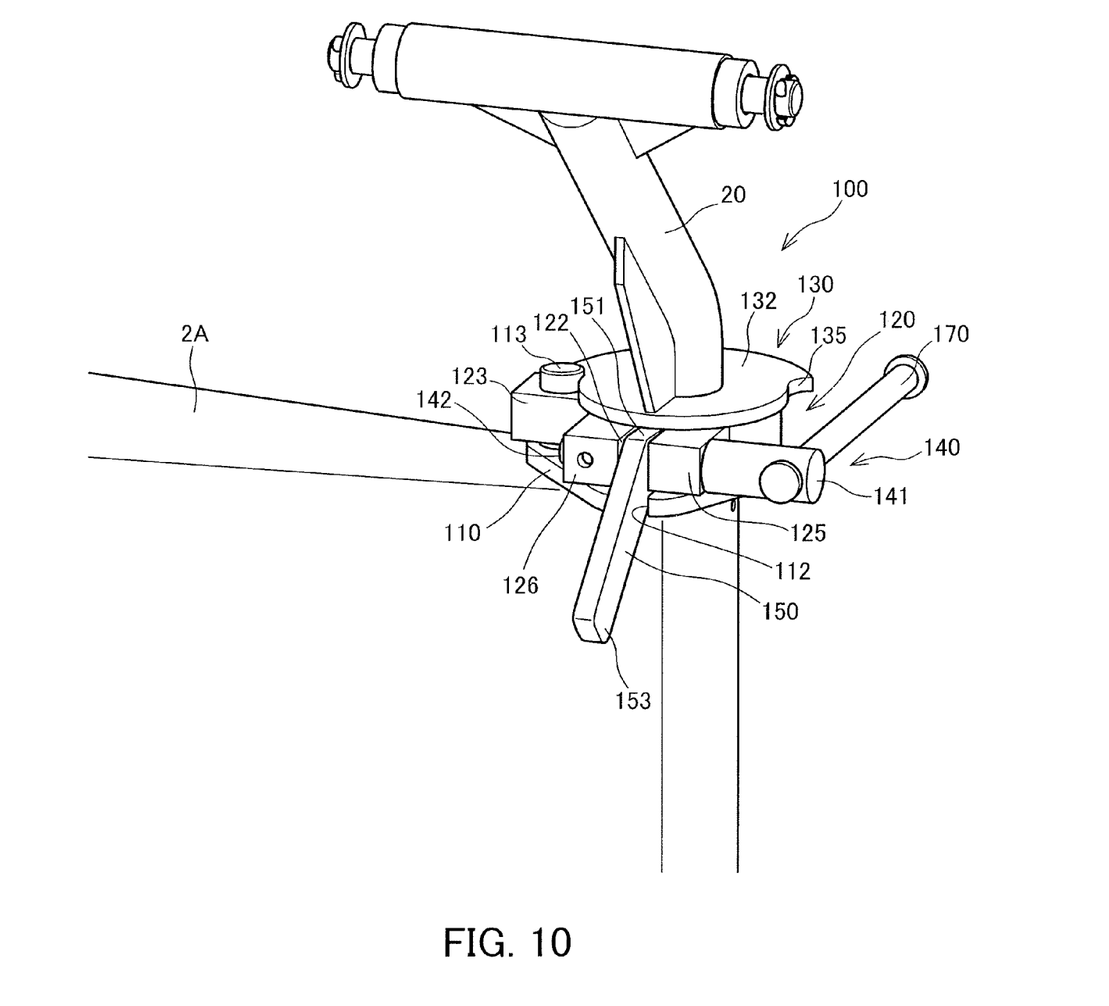
FIG. 10 is a perspective view showing the chute turning restriction mechanism when the chute is positioned in the right turning limit position.

As shown in FIG. 10, when the lever lower end portion 153 is positioned in the first position, the lock lever 150 is in a tilted attitude at a tilt relative to an up-down direction. At this time, the lever upper end portion 151 including the projecting portion 154 is positioned below the disc portion 132 of the rotary body 130 and between the end portions 125, 126 of the bracket 120.

Figure 13:
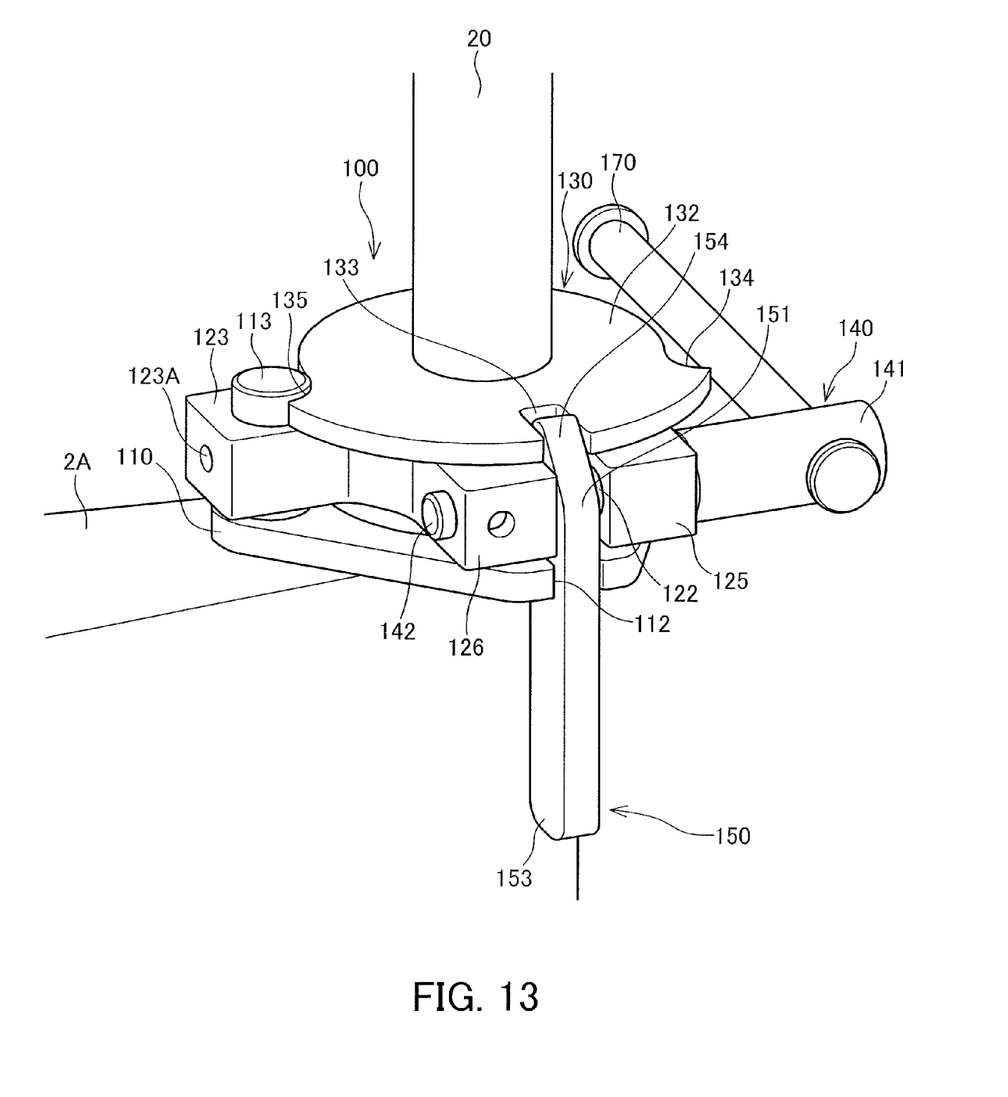
FIG. 13 is a perspective view showing the chute turning restriction mechanism when the chute is positioned in the left turning limit position after turning of the chute has been restricted by the lock lever.

As shown in FIG. 13, when the lever lower end portion 153 is positioned in the second position, the lock lever 150 is in a vertical attitude extending in the up-down direction. At this time, the projecting portion 154 of the lever upper end portion 151 projects upward between the two end portions 125, 126 of the bracket 120. When the projecting portion 154 projecting in this manner is inserted into the engagement groove 133 in the disc portion 132 of the rotary shaft 20, the lock lever 150 and the rotary body 130 enter an engaged condition in which rotation of the rotary shaft 20 is restricted.

Next, referring to FIGS. 9 to 13, an operation of the chute turning restriction mechanism 100 that restricts turning of the chute 10 will be described. It should be noted that the chute 10 provided on the rotary shaft 20 has been omitted from FIGS. 9 to 13.

Figure 9:
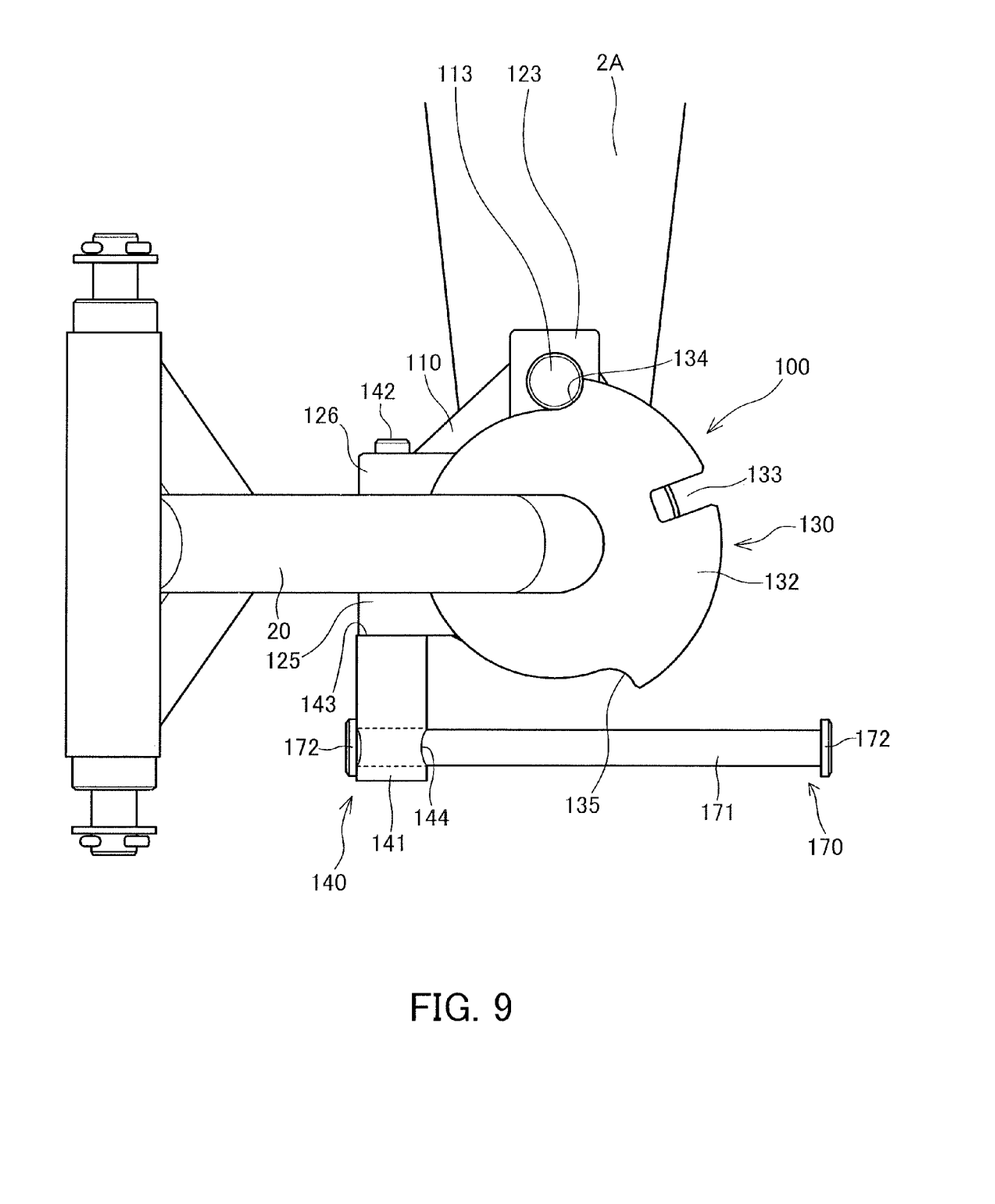
FIG. 9 is a plan view showing the chute turning restriction mechanism when the chute is positioned in a right turning limit position.

As shown in FIGS. 9 and 10, when the inner diameter of the insertion hole 121 in the bracket 120 is not narrowed by the inner diameter adjustment shaft 140 and the lever lower end portion 153 of the lock lever 150 is positioned in the first position, rotation of the rotary shaft 20 is not restricted by the chute turning restriction mechanism 100. In this case, the chute 10 can be turned freely.

Figure 12:
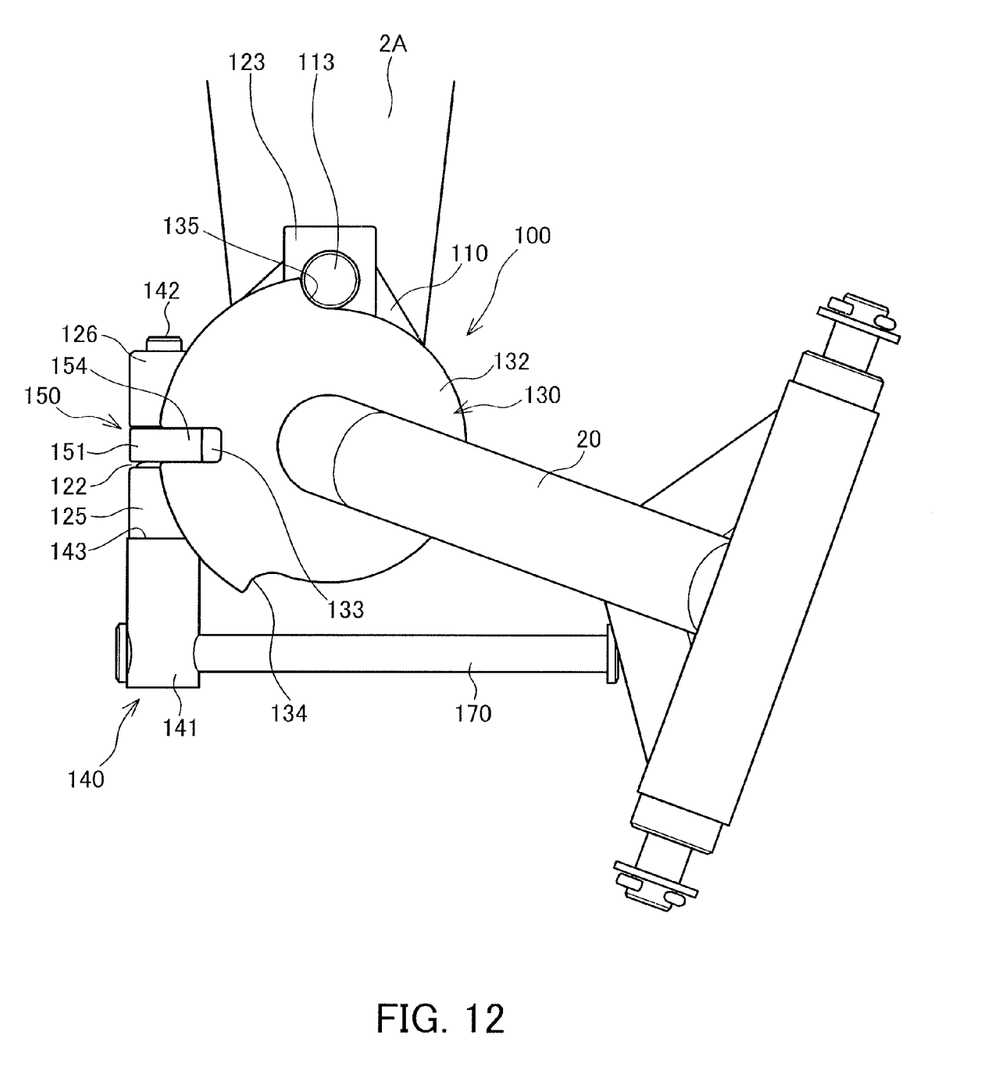
FIG. 12 is a plan view showing the chute turning restriction mechanism when the chute is positioned in the left turning limit position after turning of the chute has been restricted by the lock lever.

As shown in FIGS. 9 and 12, a first contact portion 134 that contacts an outer peripheral surface of the pin 113 projecting from the coupling hole 124 in the bracket 120 when the chute 10 turns toward a right side of the vehicle body 2, and a second contact portion 135 that contacts the outer peripheral surface of the pin 113 projecting from the coupling hole 124 in the bracket 120 when the chute 10 turns toward a left side of the vehicle body 2, are formed on an outer peripheral surface of the disc portion 132 of the rotary shaft 20.

As shown in FIG. 9, a right turning limit position (a first turning limit position) in which further rightward turning by the chute 10 is prohibited is defined by contact between the first contact portion 134 on the disc portion 132 of the rotary shaft 20 and the outer peripheral surface of the pin 113. As shown in FIG. 12, a left turning limit position (a second turning limit position) in which further leftward turning by the chute 10 is prohibited is defined by contact between the second contact portion 135 on the disc portion 132 of the rotary shaft 20 and the outer peripheral surface of the pin 113. The chute 10 is therefore capable of turning between the right turning limit position and the left turning limit position. It should be noted that the left turning limit position serves as the storage position of the chute 10.

When the chute 10 is to be positioned in a desired turning position, the inner diameter adjustment shaft 140 is rotated in order to narrow the interval of the cutaway portion 122 in the bracket 120, whereby the inner diameter of the insertion hole 121 in the bracket 120 is reduced. Accordingly, the outer peripheral surface of the columnar portion 131 of the rotary shaft 20 is clamped by the inner peripheral surface of the insertion hole 121 such that rotation of the rotary shaft 20 is restricted. As a result, turning of the chute 10 is restricted, and thus the chute 10 can be positioned in a desired turning position. As shown in FIG. 10, when the chute 10 is fixed in the desired turning position using the inner diameter adjustment shaft 140, the lever lower end portion 153 of the lock lever 150 is in the first position and the lever upper end portion 151 is positioned below the disc portion 132 of the rotary body 130.

When the chute 10 is to be positioned in the storage position (the left turning limit position), on the other hand, turning of the chute 10 is restricted by the lock lever 150.

Figure 11:
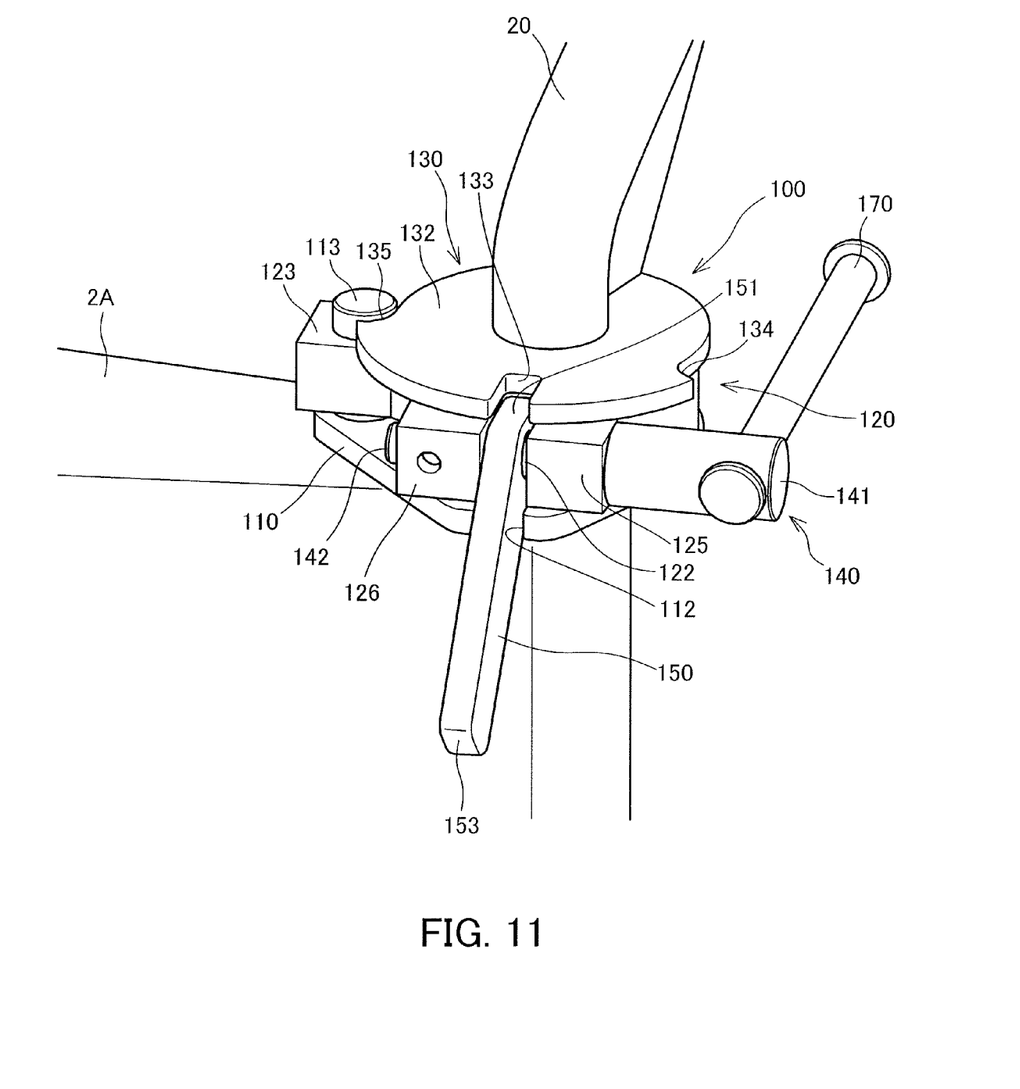
FIG. 11 is a perspective view showing the chute turning restriction mechanism when the chute is positioned in a left turning limit position and before turning of the chute is restricted by the lock lever.

At the end of a fresh concrete discharge operation or the like, the chute 10 is turned toward the storage position (the left turning limit position), as shown in FIG. 11. When the chute 10 is turned to the storage position, the engagement groove 133 of the disc portion 132 provided on the rotary shaft 20 is positioned to face the lever upper end portion 151 of the lock lever 150. Hence, the lock lever 150 can engage with the engagement groove 133 in the disc portion 132 of the rotary shaft 20 only when the chute 10 is in the storage position.

When, in this condition, the lever lower end portion 153 of the lock lever 150 is pushed down from the first position (see FIG. 11) to the second position (see FIG. 13), the projecting portion 154 of the lever upper end portion 151 projects upward between the end portions 125, 126 of the bracket 120, as shown in FIGS. 12 and 13, and is thus inserted into the engagement groove 133 in the disc portion 132. Accordingly, the lock lever 150 engages with the disc portion 132 of the rotary body 130 such that rotation of the rotary shaft 20 is restricted. As a result, turning of the chute 10 from the storage position is restricted, and therefore the chute 10 is positioned in the storage position.

When the chute 10 is positioned in the storage position, turning of the chute 10 can also be restricted by narrowing the inner diameter of the insertion hole 121 in the bracket 120 using the inner diameter adjustment shaft 140 after turning the chute 10 to the storage position. However, when only rotation of the rotary shaft 20 is restricted by the bracket 120, the inner diameter adjustment shaft 140 may rotate due to vibration and the like occurring during vehicle travel, and as a result, the clamp applied to the rotary shaft 20 by the bracket 120 may loosen such that the turning restriction on the chute 10 is released.

Hence, by engaging the lock lever 150 with the engagement groove 133 in the disc portion 132 of the rotary shaft 20 as described above such that the lock lever 150 and the disc portion 132 are mechanically coupled, the chute 10 can be fixed in the storage position more securely.

With the chute turning restriction mechanism 100 according to this embodiment, as described above, following effects can be obtained.

The chute turning restriction mechanism 100 includes the inner diameter adjustment shaft 140 that restricts rotation of the rotary shaft 20 by reducing the inner diameter of the insertion hole 121 in the bracket 120 such that the chute 10 is fixed in a desired position, and the lock lever 150 that restricts rotation of the rotary shaft 20 by engaging with the engagement groove 133 in the disc portion 132 of the rotary shaft 20 such that the chute 10 is fixed in a predetermined position (the storage position, for example). The lock lever 150 is provided to be capable of rotating about the inner diameter adjustment shaft 140. By having the inner diameter adjustment shaft 140 that adjusts the inner diameter of the insertion hole 121 in the bracket 120 double as a rotary shaft of the lock lever 150 in this manner, a number of components of the chute turning restriction mechanism 100 can be reduced. As a result, a configuration of the chute turning restriction mechanism 100 can be simplified.

The lock lever 150 is configured such that when the lever lower end portion 153 is rotated from the first position to the second position, the projecting portion 154 of the lever upper end portion 151 projects from the cutaway portion 122 in the bracket 120 and is thus inserted into the engagement groove 133 in the disc portion 132 of the rotary body 130, thereby restricting turning of the chute 10. By disposing the lock lever 150 in the cutaway portion 122 between the end portions 125, 126 of the bracket 120 in this manner, an increase in a size of the chute turning restriction mechanism 100 can be suppressed.

The guide groove 112 that guides the rotation operation of the lock lever 150 is formed in the fixed plate 110 fixed to the support arm 2A of the vehicle body 2, and therefore an operation of the lock lever 150 can be performed smoothly via the guide groove 112.

The right turning limit position and the left turning limit position of the chute 10 are defined respectively by contact between the first contact portion 134 and the second contact portion 135 provided on the disc portion 132 of the rotary shaft 20 with the outer peripheral surface of the pin 113 projecting from the coupling hole 124 in the bracket 120. Since the turning limit positions of the chute 10 are defined using the pin 113, which is also used to fix the bracket 120, the configuration of the chute turning restriction mechanism 100 can be further simplified.

Embodiments of this invention were described above, but the above embodiments are merely examples of application of this invention. The technical scope of this invention is not limited to the specific constitutions of the above embodiments.

In the chute turning restriction mechanism 100, the lock lever 150 may be configured such that when the chute 10 is turned to the storage position, the lever lower end portion 153 rotates from the first position to the second position under its own weight, whereby the lever upper end portion 151 engages with the engagement groove 133 in the rotary body 130. When the lock lever 150 is configured thus, turning of the chute 10 positioned in the storage position can be locked automatically, leading to an improvement in operating efficiency.

Further, in the chute turning restriction mechanism 100, the insertion hole 121 in the bracket 120 is formed to clamp the outer peripheral surface of the columnar portion 131 of the rotary body 130. However, the columnar portion 131 of the rotary body 130 may be omitted, and instead the insertion hole 121 in the bracket 120 may clamp the outer peripheral surface of the rotary shaft 20 directly.

Furthermore, the chute turning restriction mechanism 100 is configured such that the lock lever 150 and the engagement groove 133 in the rotary body 130 can be engaged when the chute 10 is positioned in the storage position. However, the chute turning restriction mechanism 100 may be configured such that the lock lever 150 and the engagement groove 133 in the rotary body 130 can be engaged when the chute 10 is in a predetermined position other than the storage position.

Furthermore, in the chute turning restriction mechanism 100, the pin 113 is formed to project from the fixed plate 110, but may be formed to project from the support arm 2A of the vehicle body 2.

The invention claimed is:

1. A chute turning restriction mechanism that restricts turning of a chute of a mixer truck, comprising:
    a rotary shaft on which the chute is disposed and which is provided to be capable of rotating relative to a vehicle body of the mixer truck;
    a bracket that is provided on the vehicle body, and includes an insertion hole into which the rotary shaft is inserted and a cutaway portion formed by cutting away a part of the insertion hole;
    an inner diameter adjustment shaft provided across the cutaway portion to be capable of adjusting an inner diameter of the insertion hole, and configured to restrict rotation of the rotary shaft by reducing the inner diameter of the insertion hole;
    a rotary body that is provided to rotate together with the rotary shaft and includes an engagement groove; and
    a lock lever that is provided to be capable of rotating about the inner diameter adjustment shaft, and that restricts the rotation of the rotary shaft by engaging with the engagement groove.

2. The chute turning restriction mechanism as defined in claim 1, wherein the inner diameter adjustment shaft comprises a base end shaft, a small diameter shaft having a smaller diameter than the base end shaft, and a screw portion formed on a tip end of the small diameter shaft,
    the bracket is a member including the cutaway portion, which is provided between respective ends of the bracket in a circumferential direction of the insertion hole,
    a through hole through which only the small diameter shaft passes is formed in one end of the bracket,
    a screw hole into which the screw portion is screwed is formed in another end of the bracket, and
    the inner diameter of the insertion hole is modified by rotating the inner diameter adjustment shaft to adjust an interval of the cutaway portion between the respective ends of the bracket.

3. The chute turning restriction mechanism as defined in claim 1, wherein the engagement groove engages with the lock lever only when the chute is positioned in a storage position.

4. The chute turning restriction mechanism as defined in claim 1, wherein the rotary body includes a plate-shaped member that projects in a radial direction of the rotary shaft,
    the engagement groove is formed to penetrate an outer edge position of the plate-shaped member,
    the lock lever is configured such that a lever upper end portion is positioned in the cutaway portion and a lever lower end portion rotates between a first position and a second position below the first position, and
    when the lever lower end portion is positioned in the first position, the lever upper end portion is positioned below the rotary body, and when the lever lower end portion is positioned in the second position, the lever upper end portion is inserted into the engagement groove so as to be engaged therewith.

5. The chute turning restriction mechanism as defined in claim 4, wherein the lock lever is configured to rotate from the first position to the second position under its own weight.

6. The chute turning restriction mechanism as defined in claim 1, wherein a carrying portion carrying the bracket is formed on the vehicle body, and
    a guide groove for guiding a rotation operation of the lock lever is formed in the carrying portion.

7. The chute turning restriction mechanism as defined in claim 1, wherein a pin is formed on the vehicle body so as to project from the vehicle body, and
    the bracket includes a coupling hole for coupling the bracket to the pin.

8. The chute turning restriction mechanism as defined in claim 7, wherein the rotary body comprises:
    a first contact portion that defines a first turning limit position of the chute by contacting an outer peripheral surface of the pin projecting from the coupling hole when the rotary shaft rotates in one direction; and
    a second contact portion that defines a second turning limit position of the chute by contacting the outer peripheral surface of the pin projecting from the coupling hole when the rotary shaft rotates in an opposite direction.

* * * * *